United States Patent
Mori et al.

(10) Patent No.: US 9,877,094 B2
(45) Date of Patent: Jan. 23, 2018

(54) WATERPROOF SOUND-PERMEABLE MEMBRANE AND ELECTRONIC DEVICE

(71) Applicant: NITTO DENKO CORPORATION, Ibaraki-shi, Osaka (JP)

(72) Inventors: Masaaki Mori, Osaka (JP); Toshimitsu Tachibana, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/027,965

(22) PCT Filed: Oct. 28, 2014

(86) PCT No.: PCT/JP2014/005450
§ 371 (c)(1),
(2) Date: Apr. 7, 2016

(87) PCT Pub. No.: WO2015/068357
PCT Pub. Date: May 14, 2015

(65) Prior Publication Data
US 2016/0249119 A1 Aug. 25, 2016

(30) Foreign Application Priority Data
Nov. 7, 2013 (JP) .................................. 2013-231095

(51) Int. Cl.
*H04R 1/02* (2006.01)
*H04R 1/08* (2006.01)
*B29C 41/00* (2006.01)
(Continued)

(52) U.S. Cl.
CPC ............ *H04R 1/023* (2013.01); *B29C 41/003* (2013.01); *B29C 41/14* (2013.01); *B29C 41/46* (2013.01);
(Continued)

(58) Field of Classification Search
CPC ......................... H04R 1/023; H04R 2307/025
See application file for complete search history.

(56) References Cited

U.S. PATENT DOCUMENTS 8,141,678 B2 * 3/2012 Ikeyama ................ C09J 7/0282
181/167
8,431,204 B2 * 4/2013 Ueki ...................... H04R 1/023
156/247

(Continued)

FOREIGN PATENT DOCUMENTS

JP 2003-503991 1/2003
JP 2003-053872 2/2003
(Continued)

*Primary Examiner* — Curtis Kuntz
*Assistant Examiner* — Ryan Robinson
(74) *Attorney, Agent, or Firm* — Hamre, Schumann, Mueller & Larson, P.C.

(57) ABSTRACT

Provides is a waterproof sound-permeable membrane (10) adapted to permit passage of sound and prevent entry of water. The waterproof sound-permeable membrane (10) includes a sound-permeation region (11) having a polytetrafluoroethylene (PTFE) membrane (20). The polytetrafluoroethylene membrane (20) has an average pore diameter of 0.02 μm or more and 0.1 μm or less as measured according to ASTM F316-86 and has a porosity of 5% or more and 25% or less. The waterproof sound-permeable membrane (10) is suitable for application to an electronic device containing an acoustic device.

6 Claims, 6 Drawing Sheets

(51) Int. Cl.
  *B29C 41/14* (2006.01)
  *B29C 41/46* (2006.01)
  *B29C 55/00* (2006.01)
  *B29C 55/06* (2006.01)
  *B29D 99/00* (2010.01)
  *B29K 27/18* (2006.01)
  *B29K 105/00* (2006.01)
  *B29K 105/04* (2006.01)

(52) U.S. Cl.
  CPC ............ *B29C 55/005* (2013.01); *B29C 55/06* (2013.01); *B29D 99/005* (2013.01); *H04R 1/086* (2013.01); *B29K 2027/18* (2013.01); *B29K 2105/0064* (2013.01); *B29K 2105/04* (2013.01); *B29K 2105/251* (2013.01); *B29K 2105/256* (2013.01); *B29K 2995/0001* (2013.01); *B29K 2995/0063* (2013.01); *B29K 2995/0065* (2013.01); *B29K 2995/0069* (2013.01); *H04R 2499/11* (2013.01)

(56) References Cited

U.S. PATENT DOCUMENTS

| | | |
|---|---|---|
| 8,739,926 B1 | 6/2014 | Mori |
| 9,578,402 B2 * | 2/2017 | Mori ................. H04M 1/03 |
| 2014/0332310 A1 * | 11/2014 | Seo ..................... B32B 7/12 |
| | | 181/211 |
| 2016/0247499 A1 * | 8/2016 | Sanders ............. B32B 5/028 |

FOREIGN PATENT DOCUMENTS

| | | | |
|---|---|---|---|
| JP | 2004-083811 | 3/2004 | |
| JP | 2008-245332 | 10/2008 | |
| JP | 5244257 B | 7/2013 | |
| WO | 01/03468 | 1/2011 | |
| WO | WO 2015105052 A1 * | 7/2015 | ............ H04R 1/023 |

* cited by examiner

US 9,877,094 B2

WATERPROOF SOUND-PERMEABLE MEMBRANE AND ELECTRONIC DEVICE

TECHNICAL FIELD

The present invention relates to a waterproof sound-permeable membrane and an electronic device.

BACKGROUND ART

Electronic devices such as mobile phones, laptop computers, electronic notebooks, digital cameras, and video game instruments have an audio function. Such an electronic device having an audio function includes a housing, inside which is placed a sound emitting part such as a speaker or buzzer or a sound receiving part such as a microphone. The housing is typically provided with an opening for directing sound to the sound emitting part or the sound receiving part.

It is common practice to cover the opening of the housing by a waterproof sound-permeable membrane in order to prevent foreign matters such as water drops from entering the housing of the electronic device. Known examples of the waterproof sound-permeable membrane include porous polytetrafluoroethylene (PTFE) membranes (see Patent Literature 1 to 3). A porous polytetrafluoroethylene membrane used as a waterproof sound-permeable membrane is produced by stretching a shaped product containing a fine polytetrafluoroethylene powder and a liquid lubricant so as to form pores in the shaped product.

CITATION LIST

Patent Literature

Patent Literature 1: JP 2003-53872 A
Patent Literature 2: JP 2004-83811 A
Patent Literature 3: JP 2003-503991 A

SUMMARY OF INVENTION

Technical Problem

There is an increasing demand for enhancement of waterproofness of waterproof sound-permeable membranes. The use of an imperforate membrane as a waterproof sound-permeable membrane can ensure good waterproofness. Imperforate membranes, however, have poor sound permeability. It is challenging to provide an improvement on waterproof sound-permeable membranes so as to achieve enhanced waterproofness without significant loss in sound permeability.

In view of these circumstances, the present invention aims to provide an improvement on waterproof sound-permeable membranes.

Solution to Problem

The present invention provides a waterproof sound-permeable membrane adapted to permit passage of sound and prevent entry of water, the waterproof sound-permeable membrane including a sound-permeation region having a polytetrafluoroethylene membrane. The polytetrafluoroethylene membrane has an average pore diameter of 0.02 μm or more and 0.1 μm or less as measured according to ASTM F316-86 and has a porosity of 5% or more and 25% or less.

Advantageous Effects of Invention

The average pore diameter and porosity of the polytetrafluoroethylene membrane in the waterproof sound-permeable membrane of the present invention are small and suitable for enhancement of waterproofness. The average pore diameter and porosity of the polytetrafluoroethylene membrane are more than zero and suitable also for ensuring of good sound permeability.

DESCRIPTION OF EMBODIMENTS

Hereinafter, embodiments of the present invention will be described with reference to the accompanying drawings. The following description is only illustrative of embodiments of the present invention and has no intention to limit the present invention.

Figure 1:
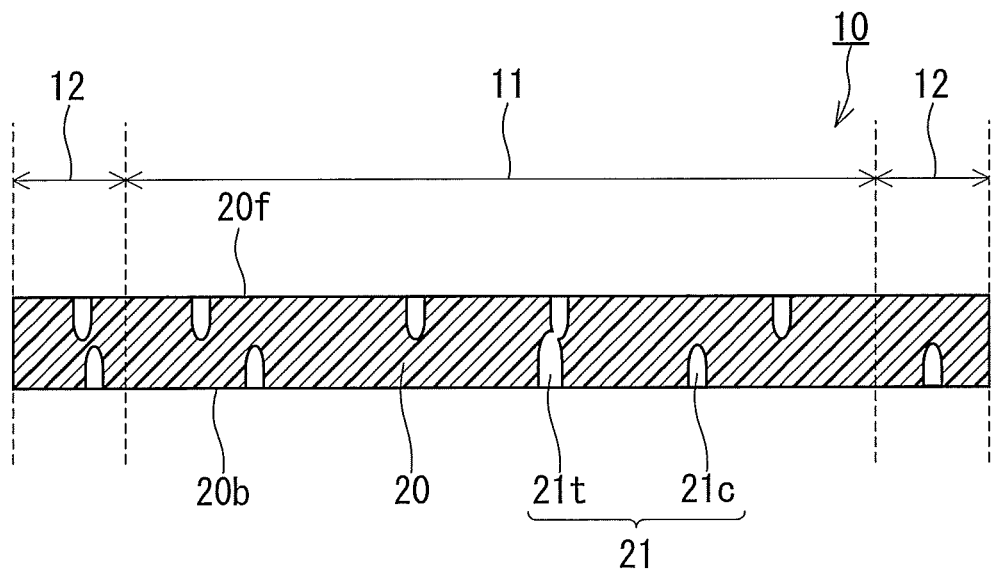
FIG. 1 is a cross-sectional view showing an example of the waterproof sound-permeable membrane of the present invention.
Figure 2:
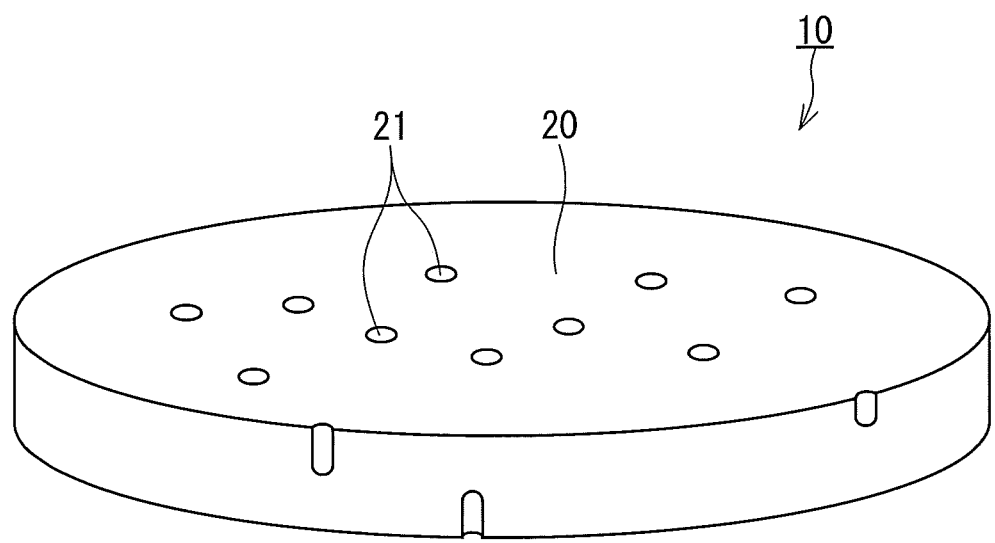
FIG. 2 is a perspective view of the waterproof sound-permeable membrane shown in FIG. 1.

A waterproof sound-permeable membrane of the present embodiment will be described using FIG. 1 and FIG. 2. The waterproof sound-permeable membrane 10 has a sound-permeation region 11 and an edge region 12 surrounding the sound-permeation region 11. The sound-permeation region 11 permits passage of sound. The edge region 12 can serve as a portion for attachment to a housing, and is, for example, welded to a housing.

The sound-permeation region 11 and the edge region 12 have a polytetrafluoroethylene (PTFE) membrane 20. In the present embodiment, the sound-permeation region 11 and the edge region 12 consist only of the PTFE membrane 20.

A top surface 20f and an under surface 20b of the PTFE membrane 20 are in contact with the ambient atmosphere in the sound-permeation region 11. This embodiment is suitable for achieving good sound permeability. The top surface 20f and the under surface 20b of the PTFE membrane 20 of the waterproof sound-permeable membrane 10 shown in FIG. 1 and FIG. 2 are in contact with the ambient atmosphere also in the edge region 12.

The PTFE membrane 20 is a solid membrane having pores 21 formed therein, the pores 21 being separate from each other. In other words, the PTFE membrane 20 has a different structure from a stretched porous PTFE membrane obtainable by a conventional method, i.e., by stretching a shaped product containing a PTFE fine powder and a liquid lubricant. A stretched porous PTFE membrane obtained by the convention method overall has a non-solid structure composed of a huge number of fibrils and nodes. A single continuous pore extending over the inside of the membrane is formed in the non-solid structure. By contrast, the PTFE membrane 20 has a structure having a non-porous base material and the pores 21 formed in the base material, although the PTFE membrane 20 is similar to the conventional stretched porous PTFE in that it has pores.

The pores 21 extend in the thickness direction of the PTFE membrane 20. The pores 21 include through holes 21t penetrating through the PTFE membrane 20 and bottomed holes 21c not penetrating through the PTFE membrane 20. The presence of the pores 21 results in a positive value of the porosity of the PTFE membrane 20, and the presence of the through holes 21t results in a positive value of the gas permeability of the PTFE membrane 20. It is desirable for the gas permeability to have a positive value (to be not zero) in order to reduce pressure variation caused by temperature variation in a cooling space of an electronic device.

A porous structure formed of fibrils and nodes is more suitable for products such as an air filter which is required to have high gas permeability. This porous structure is useful also for waterproof sound-permeable membranes. For a waterproof sound-permeable membrane that is required to have high waterproofness, however, the membrane structure possessed by the PTFE membrane 20 may be advantageous in achieving desired properties of the waterproof sound-permeable membrane. A preferred embodiment of the present invention employs a solid membrane having the pores 21 formed therein. This membrane can be obtained, for example, by forming a solid membrane from a dispersion of PTFE and then slightly stretching the membrane to form the pores 21.

The PTFE membrane 20 has an average pore diameter of 0.02 μm or more and 0.1 μm or less as measured according to ASTM (American Society for Testing and Materials) F316-86. The PTFE membrane 20 has a porosity of 5% or more and 25% or less. In order to ensure better waterproofness, the average pore diameter and the porosity are preferably smaller (most preferably zero). However, the average pore diameter and the porosity are adjusted in the above ranges to obtain a good balance with sound permeability. The average pore diameter of the PTFE membrane 20 is preferably 0.04 μm or more and 0.08 μm or less. The porosity of the PTFE membrane 20 is preferably 5% or more and 23% or less.

The thickness of the PTFE membrane 20 is preferably 5 μm or more and 15 μm or less and more preferably 5 μm or more and 10 μm or less, in order to achieve higher levels of both sound permeability and waterproofness. From the same standpoint, the surface density of the PTFE membrane 20 is, for example, 13 g/m$^2$ or more and 35 g/m$^2$ or less, preferably 15 g/m$^2$ or more and 35 g/m$^2$ or less, and more preferably 15 g/m$^2$ or more and 25 g/m$^2$ or less.

An exemplary measure of the waterproofness is water entry pressure. For example, it is recommendable to measure the water entry pressure of the PTFE membrane using a water penetration test apparatus (for high hydraulic pressure method) specified in JIS L 1092: 2009, with a stainless steel mesh (having an opening size of 2 mm) being placed on a surface of the PTFE membrane opposite to that subjected to pressure so as to reduce the deformation of the PTFE membrane to some extent. The water entry pressure of the waterproof sound-permeable membrane 10 (PTFE membrane 20) thus measured is preferably 400 kPa or more and more preferably 500 kPa or more.

An exemplary measure of the sound permeability is insertion loss for 1,000 Hz sound. The insertion loss of the waterproof sound-permeable membrane 10 (PTFE membrane 20) for 1,000 Hz sound is preferably 3.5 dB or less, more preferably 3 dB or less, and even more preferably 2.5 dB or less. Another exemplary measure of the sound permeability is insertion loss for sound in a predetermined frequency range. The insertion loss of the waterproof sound-permeable membrane 10 (PTFE membrane 20) for 100 to 5,000 Hz sound is preferably 3.5 dB or less and more preferably 3 dB or less. However, having too small an insertion loss is likely to lead to a failure to ensure good waterproofness. In view of this, the insertion loss of the waterproof sound-permeable membrane 10 (PTFE membrane 20) for 1,000 Hz sound may be 1 dB or more. Similarly, the insertion loss of the waterproof sound-permeable membrane 10 (PTFE membrane 20) for 100 to 3,000 Hz sound may be 1 dB or more. The insertion loss can be defined as a difference between the amount of sound attenuation (sound pressure level) A measured in the presence of the waterproof sound-permeable membrane 10 between a sound source and a sound receiving point and the amount of sound attenuation B measured using the same conditions as for the amount of sound attenuation A except for the absence of the waterproof sound-permeable membrane 10.

An exemplary measure of the gas permeability is a value determined by B method (Gurley method) of gas permeability measurement specified in JIS L 1096. The through-thickness gas permeability of the PTFE membrane 20, as expressed by such a value, is 1,000 to 60,000 seconds/100 mL, for example.

The PTFE membrane 20 may be colored. For example, a dye or a pigment may be applied to the top surface 20f or the under surface 20b of the PTFE membrane 20. Black carbon may be contained within the PTFE membrane 20. For example, it is recommendable to color the PTFE membrane 20 depending on the color of the housing so that the PTFE membrane 20 becomes inconspicuous. The PTFE membrane 20 remaining uncolored is white.

The PTFE membrane 20 may be subjected to liquid-repellent treatment. The liquid-repellent treatment can improve the water repellency or oil repellency of the PTFE membrane 20. The liquid-repellent treatment may be accomplished using a liquid-repellent agent containing a polymer having a perfluoroalkyl group.

Figure 3:
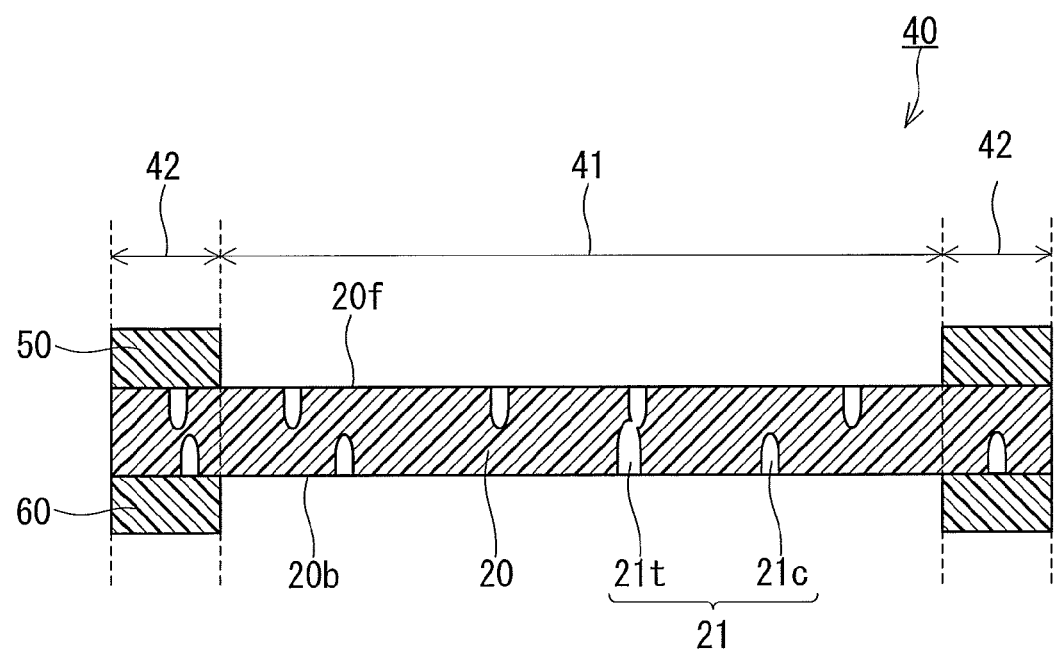
FIG. 3 is a cross-sectional view showing another example of the waterproof sound-permeable membrane of the present invention.
Figure 4:
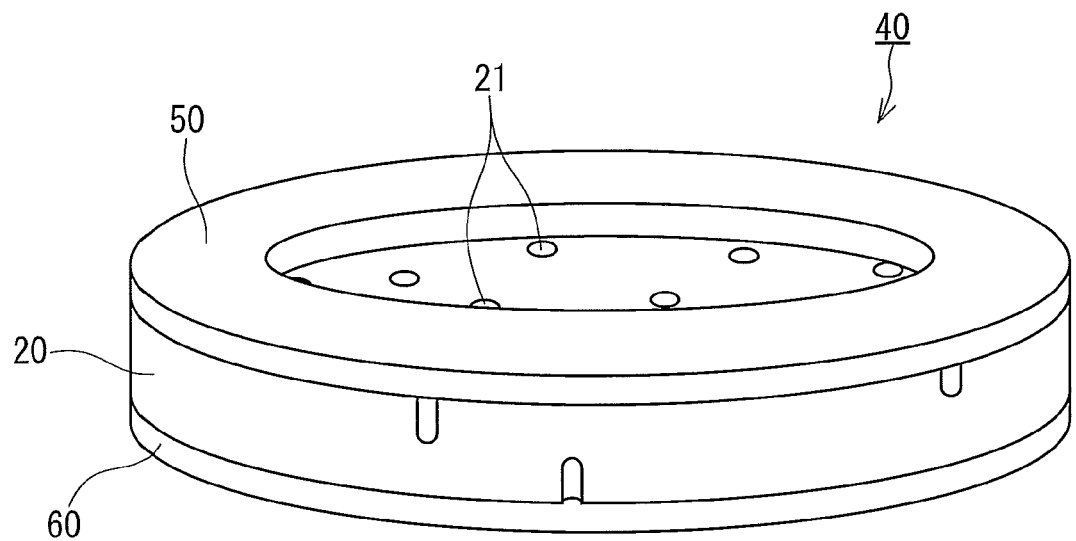
FIG. 4 is a perspective view of the waterproof sound-permeable membrane shown in FIG. 3.

The waterproof sound-permeable membrane may include a reinforcing member and an adhesive layer. A waterproof sound-permeable membrane 40 shown in FIGS. 3 and 4 includes an edge region 42 surrounding a sound-permeation region 41 and includes, in the edge region 42, a reinforcing member 50 secured to one side of the PTFE membrane 20 and an adhesive layer 60 secured to the other side of the PTFE membrane 20 remote from the reinforcing member 50. The inclusion of the reinforcing member 50 reinforces the waterproof sound-permeable membrane 40 and allows easy handling of the waterproof sound-permeable membrane 40. Additionally, the reinforcing member 50 can function as a grip portion, which allows easy attachment of the waterproof sound-permeable membrane 40 to the housing. The reinforcing member 50 can also function as a portion for attachment, for example, to a microphone. Direct or indirect attachment of a microphone to the reinforcing member 50 will prevent interference between the sound-permeation region 41 and the microphone. Furthermore, the inclusion of the adhesive layer 60 in contact with the ambient atmosphere can simplify the attachment of the waterproof sound-permeable membrane 40 to the housing.

The reinforcing member 50 and the adhesive layer 60 have a ring shape, which means that the sound-permeation region 41 has the PTFE membrane 20, while the edge region 42 has the PTFE membrane 20, the reinforcing member 50, and the adhesive layer 60. The top surface 20*f* and the under surface 20*b* of the PTFE membrane 20 are in contact with the ambient atmosphere in the sound-permeation region 41. The shape of the reinforcing member 50 and the adhesive layer 60 may be changed as appropriate in conformity with the shape of the PTFE membrane 20. When, for example, the PTFE membrane 20 has a rectangular shape, the reinforcing member 50 and the adhesive layer 60 may be in the shape of a rectangular flame.

The reinforcing member 50 can be formed of, for example, a resin, a metal, or a composite thereof. The PTFE membrane 20 and the reinforcing member 50 can be joined together, for example, by heat welding, ultrasonic welding, bonding with an adhesive, or bonding with a double-faced tape. The adhesive layer 60 may consist only of an adhesive or may be a double-faced tape.

Either the reinforcing member 50 or the adhesive layer 60 may only be provided on the PTFE membrane 20. That is, the waterproof sound-permeable membrane may be a membrane that includes an edge region surrounding a sound-permeation region and that includes the reinforcing member 50 secured to the PTFE membrane 20 in the edge region. Alternatively, the waterproof sound-permeable membrane may be a membrane that includes an edge region surrounding a sound-permeation region and that includes the adhesive layer 60 secured to the PTFE membrane 20 in the edge region.

Figure 5:
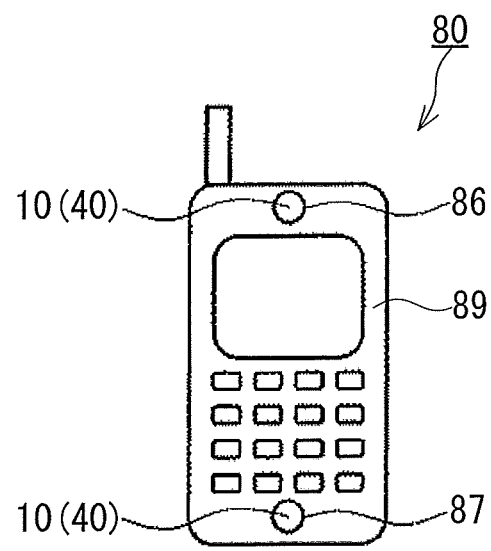
FIG. 5 is a front view showing a mobile phone as an example of the electronic device of the present invention.
Figure 6:
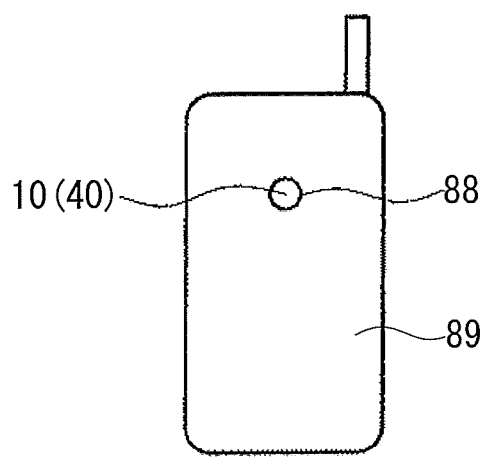
FIG. 6 is a back view of the mobile phone shown in FIG. 5.

FIG. 5 and FIG. 6 show an example of the electronic device of the present invention that includes the waterproof sound-permeable membrane 10 (which may be replaced by the waterproof sound-permeable membrane 40). The electronic device shown in FIG. 5 and FIG. 6 is a mobile phone 80. A housing 89 of the mobile phone 80 is provided with openings for sound emitting or receiving parts such as a speaker 86, a microphone 87, and a buzzer 88. The waterproof sound-permeable membranes 10 are attached inside the housing 89 so as to cover these openings. In this example, the waterproof sound-permeable membranes 10 serve to prevent entry of water or dust into the housing 89 and protect the sound emitting or receiving parts.

The waterproof sound-permeable membrane 10 can be used in various electrical appliances having an audio function, such as a laptop computer, an electronic notebook, a digital camera, and a portable audio player. In summary, the electronic device of the present embodiment includes: a sound emitting part or a sound receiving part; a housing containing the sound emitting part or the sound receiving part and provided with an opening for directing sound to the sound emitting part or the sound receiving part; and the waterproof sound-permeable membrane joined to the housing so as to cover the opening.

There will now be described an example of the production method adapted to produce the waterproof sound-permeable membrane as described above which includes a sound-permeation region having a PTFE membrane.

First, a substrate is coated with a dispersion of a PTFE powder (PTFE dispersion). The PTFE dispersion can be prepared according to commonly-known procedures. The PTFE dispersion may be a commercially-available one. The substrate may be formed of a heat-resistant material such as a heat-resistant plastic (e.g., polyimide or polyetheretherketone), metal, or ceramic. The shape of the substrate is not particularly limited, and may be, for example, a sheet shape, tubular shape, or rod shape. The coating of the substrate with the PTFE dispersion can be done, for example, by dipping and withdrawing the substrate in and from the PTFE dispersion, by spraying the substrate with the PTFE dispersion, or by applying the PTFE dispersion onto the substrate with a brush. The PTFE dispersion may contain a surfactant such as a silicone-based or fluorine-based surfactant to have an increased ability to wet the surfaces of the substrate. The thickness of the applied coating can be adjusted using a metering bar after the coating process.

Next, the PTFE dispersion (together with the substrate) is heated to remove the dispersion medium by evaporation and bind the PTFE powder particles together. The heating results in the formation of an imperforate PTFE membrane on each of the two surfaces of the substrate. The present embodiment employs multiple heating consisting of heating the PTFE dispersion at the evaporation temperature of the dispersion medium to remove the dispersion medium and then continuing heating at an increased temperature equal to or higher than the melting point of PTFE for a given period of time. Alternatively, one-stage heating may be employed which consists of heating the PTFE dispersion at a temperature equal to or higher than the melting point of PTFE for a given period of time.

In the present embodiment, the step of coating the substrate with the PTFE dispersion and the step of heating the PTFE dispersion are repeatedly performed. Alternatively, these steps may each be carried out only once.

Next, the imperforate PTFE membrane is peeled from the substrate. The imperforate PTFE membrane peeled is uniaxially stretched in the MD direction (length direction). This yields a PTFE membrane having pores as shown in FIG. 1 and FIG. 2. Advantageously, the stretching factor in the uniaxial direction is, for example, 1.5 to 6.0 in order to form an appropriate size of pores and achieve improved sound permeability without significant loss in waterproofness. The stretching in the MD direction may be followed by further stretching in the TD direction (width direction). That is, the imperforate PTFE membrane may be biaxially stretched. In this case, it is advantageous that the stretching factor in the MD direction be, for example, 1.5 to 3.0, the stretching factor in the TD direction be, for example, 2.0 to 3.0, and the stretching factor in the MD direction multiplied by the stretching factor in the TD direction be, for example, 3.0 to 9.0.

The PTFE membrane can be colored by applying a solution containing a dye or a pigment dissolved in a solvent to the PTFE membrane by means of, for example, a kiss coater and then drying the solution on the PTFE membrane. Carbon may be contained in the PTFE dispersion to allow the resulting PTFE membrane to be black.

EXAMPLES

The present invention will be described in detail by way of Examples. It should be noted that Examples given below are only illustrative of the present invention and do not limit the present invention. Methods for evaluating PTFE membranes according to Examples and Comparative Examples will first be described.

<Average Pore Diameter>

The average pore diameter was measured according to ASTM (American Society for Testing and Materials) F316-86. To be specific, the measurement of the average pore diameter was carried out using a commercially-available measurement apparatus (Perm-Prometer manufactured by Porous Material, Inc.) capable of automatic measurement complying with the ASTM standard.

<Thickness>

The thickness was measured using a micrometer.

<Surface Density>

A portion of each of the PTFE membranes of Examples and Comparative Examples was punched out with a 47-mm-diameter punch. The mass of the punched portion was measured, and the mass per 1 m² was calculated to determine the surface density.

<Porosity>

The bulk density of each PTFE membrane was determined from its volume and weight, and its porosity was calculated by the following formula on the assumption that the membrane had a true density of 2.18 g/cm³: Porosity={1−(weight [g]/(thickness [cm]×area [cm²]×true density [2.18 g/cm³]))}×100(%).

<Water Entry Pressure>

The water entry pressure of each PTFE membrane was measured using a water penetration test apparatus (for high hydraulic pressure method) specified in JIS L 1092: 2009. When a waterproof sound-permeable membrane as a test specimen has an area specified in this standard, the waterproof sound-permeable membrane undergoes significant deformation. In the measurement of the water entry pressure of each PTFE membrane, a stainless steel mesh (having an opening size of 2 mm) was placed on the surface of the PTFE membrane opposite to that subjected to pressure so as to reduce the deformation of the PTFE membrane to some extent.

<Gas Permeability>

The gas permeability of each PTFE membrane was evaluated according to B method (Gurley method) of gas permeability measurement specified in JIS L 1096.

<Acoustic Characteristics (Insertion Loss)>

Figure 7:
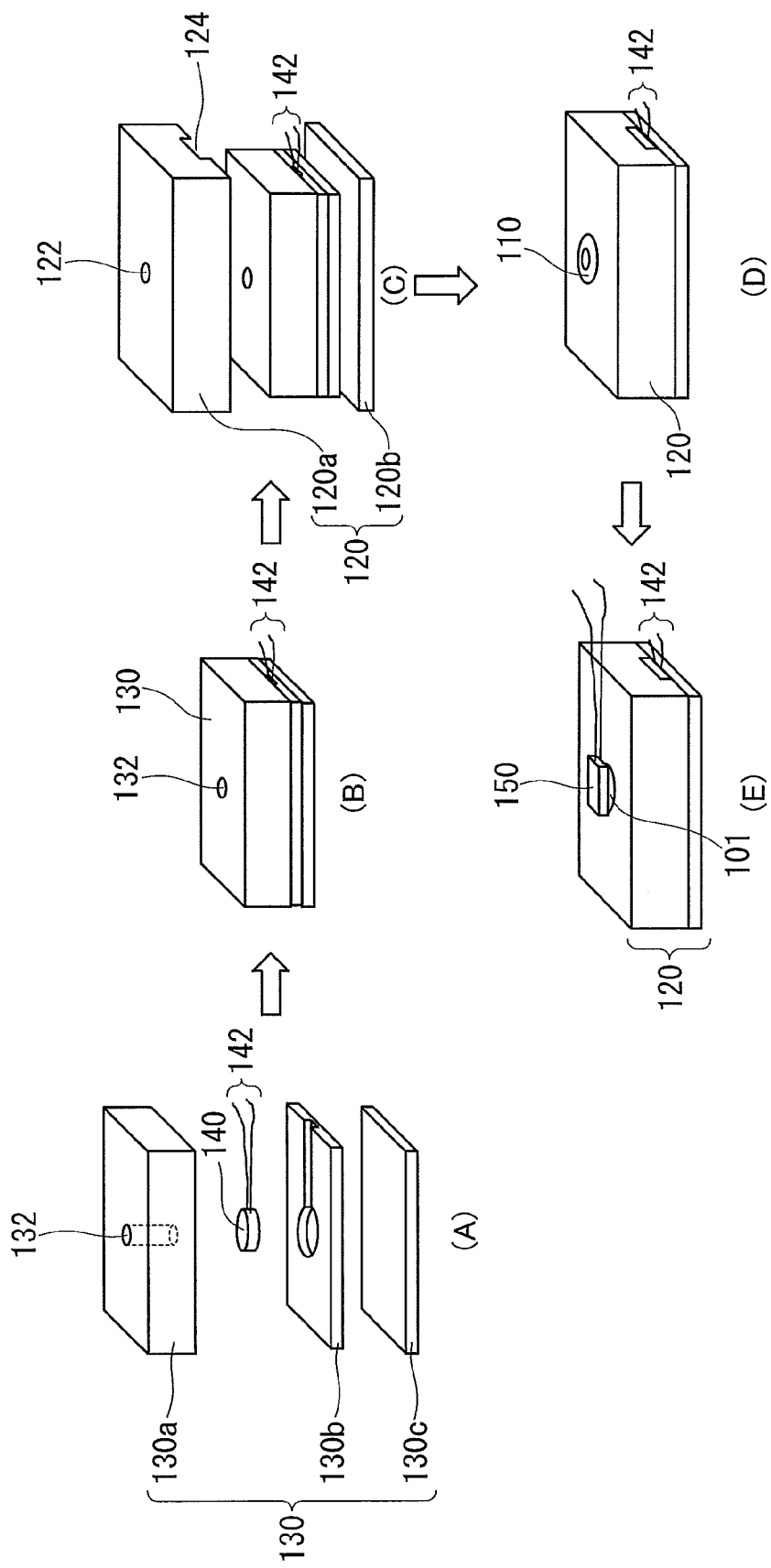
FIG. 7 is a diagram illustrating the procedures for producing an evaluation system for acoustic characteristics.

The acoustic characteristics of the PTFE membranes of Examples and Comparative Examples were evaluated in the manner described hereinafter. First, a system for evaluation was constructed as shown in FIG. 7. To begin with, a speaker 140 (SCG-16A manufactured by STAR MICRONICS CO., LTD.) connected to a speaker cable 142, and a filler 130 made of urethane sponge, were prepared (FIG. 7(A)). The filler 130 was constructed of: a part 130a having a sound hole 132 with a diameter of 5 mm; a part 130c designed to serve as the bottom of the filler 130; and a part 130b having a slot for placing the speaker 140 and the speaker cable 142 and designed to lie between the part 130a and the part 130c. Next, the filler 130 was assembled, with the speaker 140 and the speaker cable 142 being placed in the slot of the part 130b (FIG. 7 (B)). Next, a simulant housing 120 made of polystyrene was prepared (FIG. 7 (C)). The simulant housing 120 was constructed of: a part 120a having a sound hole 122 with a diameter of 2 mm and a cut 124; and a part 120b designed to serve as the bottom of the simulant housing 120. Next, the simulant housing 120 was assembled in such a manner that the speaker 140, the speaker cable 142, and the filler 130 were placed inside the simulant housing 120 and that the speaker cable 142 was led to the outside of the simulant housing 120 through the cut 124 (FIG. 7 (D)). The simulant housing 120 assembled had outer dimensions of 60 mm×50 mm×28 mm. Next, the opening of the cut 124 was closed with putty.

Figure 8:
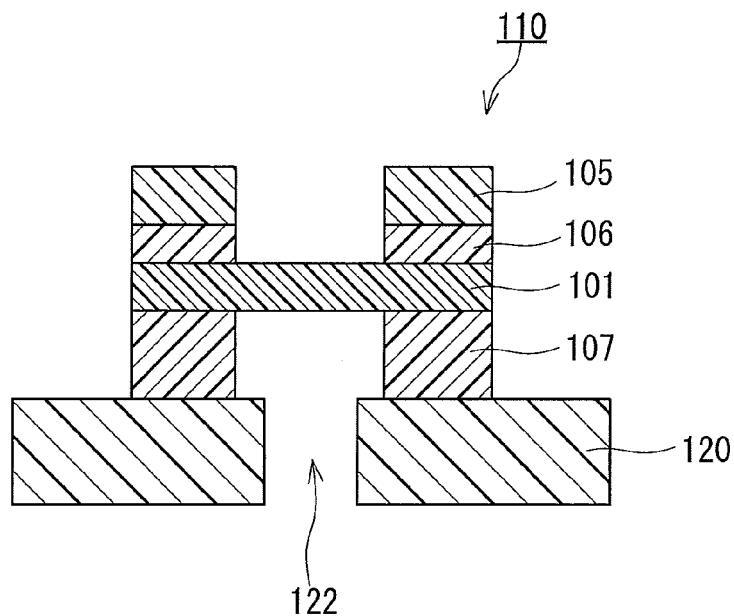
FIG. 8 is an enlarged view of an evaluation sample.

Subsequently, an evaluation sample 110 was attached to an outer surface of the simulant housing 120 so as to cover the sound hole 122 (FIG. 8 and FIG. 7 (D)). The evaluation sample 110 was a stack of a 0.20-mm-thick double-faced tape 107 (manufactured by Nitto Denko Corporation, No. 57120B), a PTFE membrane 101 of Example or Comparative Example (PTFE membrane E1, E2, E3, C1, C2, or C3), a 0.03-mm-thick double-faced tape 106 (manufactured by Nitto Denko Corporation, No. 5603), and a 0.1-mm-thick PET membrane 105 which were arranged in this order. The double-faced tape 107 includes a base of polyethylene foam and acrylic adhesives placed on both sides of the base. The double-faced tape 106 includes a base of PET and acrylic adhesives placed on both sides of the base. The double-faced tape 107, the double-faced tape 106, and the PET membrane 105 were each a punched-out piece having an inner diameter of 2.5 mm and an outer diameter of 5.8 mm. The PTFE membrane 101 was a punched-out piece having an outer diameter of 5.8 mm.

Next, a microphone 150 (SPM 0405HD4H-WB manufactured by Knowles Acoustics) was placed above the PTFE membrane 101 so as to cover the PTFE membrane 101 (FIG. 7 (E)). The speaker cable 142 and the microphone 150 were connected to an acoustic evaluation apparatus (Multi-analyzer System 3560-B-030 manufactured by B&K Sound & Vibration Measurement AIS). The distance between the speaker 140 and the microphone 150 was 21 mm.

Under the above conditions, a test signal input to the speaker 140 from the acoustic evaluation apparatus and a signal received by the microphone 150 were sampled to determine the amount of signal attenuation A. Additionally, the PTFE membrane 101 was deliberately broken to form a 2.5-mm-diameter through hole, and the amount of signal attenuation B (sound pressure level in a blank state) was determined in the same manner as the amount of attenuation A. The amount of attenuation B was −21 dB. The acoustic insertion loss due to the presence of the PTFE membrane 101 was determined by subtracting the amount of attenuation A from the amount of attenuation B. A smaller insertion loss serves as a basis for determining that the volume of sound output from the speaker 140 is maintained better. This test employed SSR analysis (test signals of 20 Hz to 10 kHz, sweep) as an evaluation technique. In this test, the acoustic evaluation apparatus automatically determined the insertion loss.

Example 1

There was prepared an aqueous dispersion containing 40 weight % of an unsintered PTFE powder (the PTFE powder had an average particle diameter of 0.2 μm and the dispersion contained 6 parts by weight of a non-ionic surfactant per 100 parts by weight of PTFE). To this aqueous dispersion was added 1 part by weight of a fluorine-based surfactant (MEGAFACE F-142D manufactured by DIC Corporation) per 100 parts by weight of PTFE. An elongated polyimide film (substrate) with a thickness of 125 μm was dipped in and withdrawn from the resulting dispersion. Next, the thickness of the coating of the dispersion applied on the substrate was adjusted to 13 μm with a metering bar. Subsequently, the dispersion (together with the substrate) was heated at 100° C. for 1 minute to remove water by evaporation and then further heated at 390° C. for 1 minute to bind the PTFE powder particles together. The same sequence of the dipping, coating, and heating was repeated three times in total. Thus, an imperforate PTFE membrane was formed on each of the two surfaces of the substrate. Next, the imperforate PTFE membrane was peeled from the substrate. The obtained imperforate PTFE membrane had a thickness of 14 μm. Subsequently, the imperforate PTFE membrane was stretched by a factor of 3 at a temperature of 150° C. in the MD direction. Thus, a PTFE membrane E1 was obtained. The PTFE membrane E1 had a thickness of 8 μm.

Example 2

A PTFE membrane E2 was obtained in the same manner as in Example 1, except that the stretching factor in stretching of the imperforate PTFE membrane was 2.

Example 3

A PTFE membrane E3 was obtained in the same manner as in Example 1, except that the stretching factor in stretching of the imperforate PTFE membrane was 3.5.

Comparative Example 1

The imperforate PTFE membrane of Example 1 was used as a PTFE membrane C1.

Comparative Example 2

An imperforate PTFE membrane was obtained in the same manner as in Example 1, except that the thickness of the coating of the dispersion applied on the substrate was adjusted to 15 μm with a metering bar and that the sequence of dipping, coating, and heating was repeated four times in total. This imperforate PTFE membrane was used as a PTFE membrane C2. The PTFE membrane C2 had a thickness of 25 μm.

Comparative Example 3

An amount of 100 parts by weight of a PTFE fine powder (650-J, manufactured by Du Pont-Mitsui Fluorochemicals Company, Ltd.) and 20 parts by weight of n-dodecane as a forming aid (manufactured by Japan Energy Corporation) were uniformly mixed. The resulting mixture was compressed with a cylinder and then rum-extruded into a sheet-shaped mixture. The resulting sheet-shaped mixture was rolled to a thickness of 0.16 mm by passing it between paired metal rolls and then heated at 150° C. to dry and remove the forming aid. Thus, a sheet-shaped product of PTFE was obtained. Two such sheet-shaped products were stacked together. The resulting stack was stretched by a factor of 5 at a temperature of 260° C. in the length direction (rolling direction). Thus, a porous PTFE membrane was obtained. Subsequently, this porous PTFE membrane was dipped in a liquid-repellent treatment solution for several seconds and then heated at 100° C. to dry and remove the solvent. The oil-repellent treatment solution was prepared in the manner described hereinafter. First, 100 g of a compound having a linear fluoroalkyl group and represented by (Formula 1) shown below, 0.1 g of azobisisobutyronitrile as a polymerization initiator, and 300 g of a solvent (FS thinner manufactured by Shin-Etsu Chemical Co., Ltd.) were put in a flask fitted with a nitrogen introduction tube, a thermometer, and a stirrer. Nitrogen gas was then introduced into this flask. The contents in the flask were stirred to allow additional polymerization to proceed at 70° C. for 16 hours to yield 80 g of a fluorine-containing polymer. This fluorine-containing polymer had a number-average molecular weight of 100,000. This fluorine-containing polymer was mixed with a diluent (FS thinner manufactured by Shin-Etsu Chemical Co., Ltd.) to prepare the liquid-repellent treatment solution having a concentration of the polymer of 3.0 mass %.

$$CH_2=CHCOOCH_2CH_2C_6F_{13} \qquad \text{(Formula 1)}$$

Next, the porous PTFE membrane subjected to the liquid-repellent treatment was stretched by a factor of 30 at a temperature of 150° C. in the width direction, and then wholly sintered at a temperature of 360° C. which is higher than the melting point of PTFE (327° C.). In this manner, a PTFE membrane C3 was obtained. The PTFE membrane C3 had a thickness of 20 μm.

Figure 9:
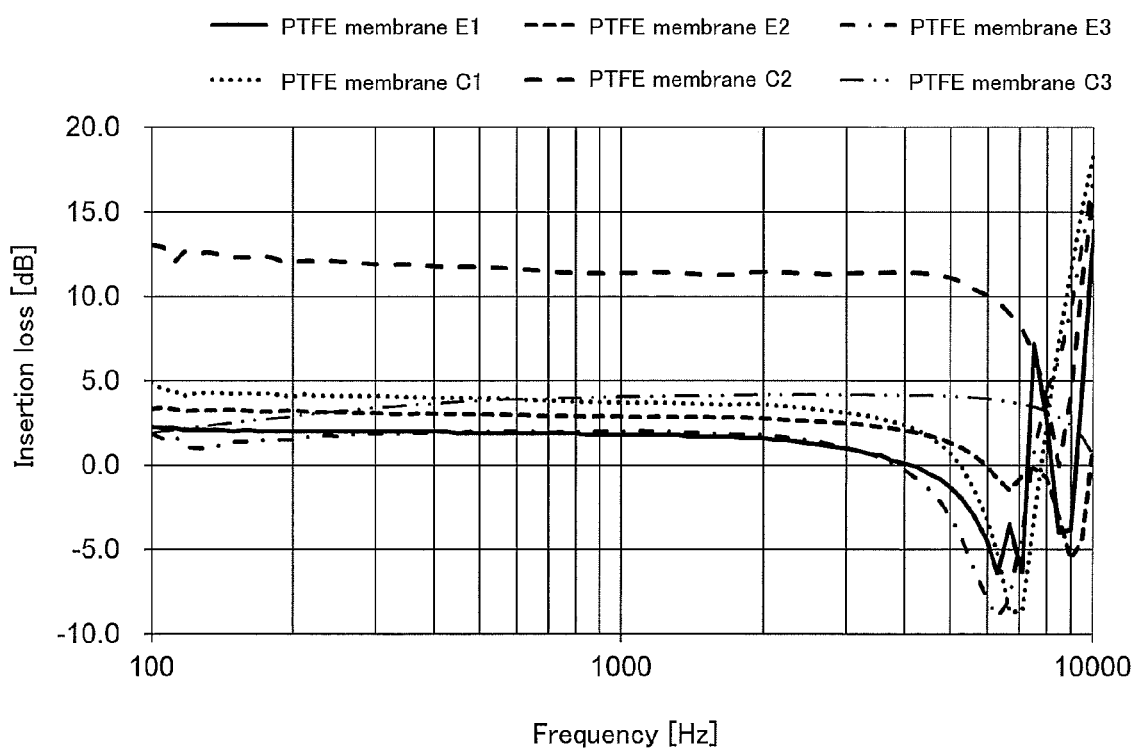
FIG. 9 shows graphs representing the acoustic characteristics of evaluation samples of Examples and Comparative Examples.
Figure 10:
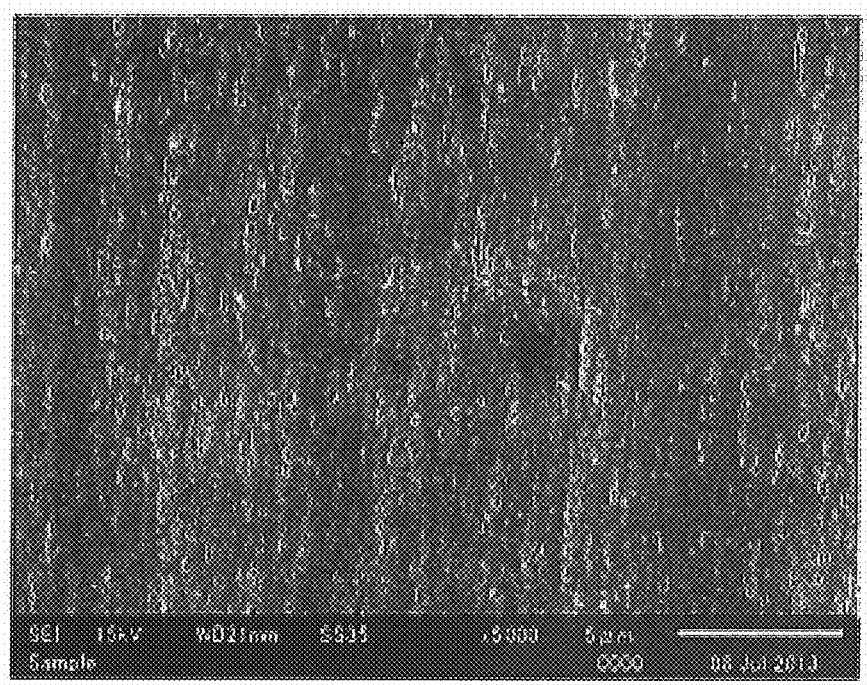
FIG. 10 is a SEM (scanning electron microscope) image of the surface of a polytetrafluoroethylene membrane of Example.
Figure 11:
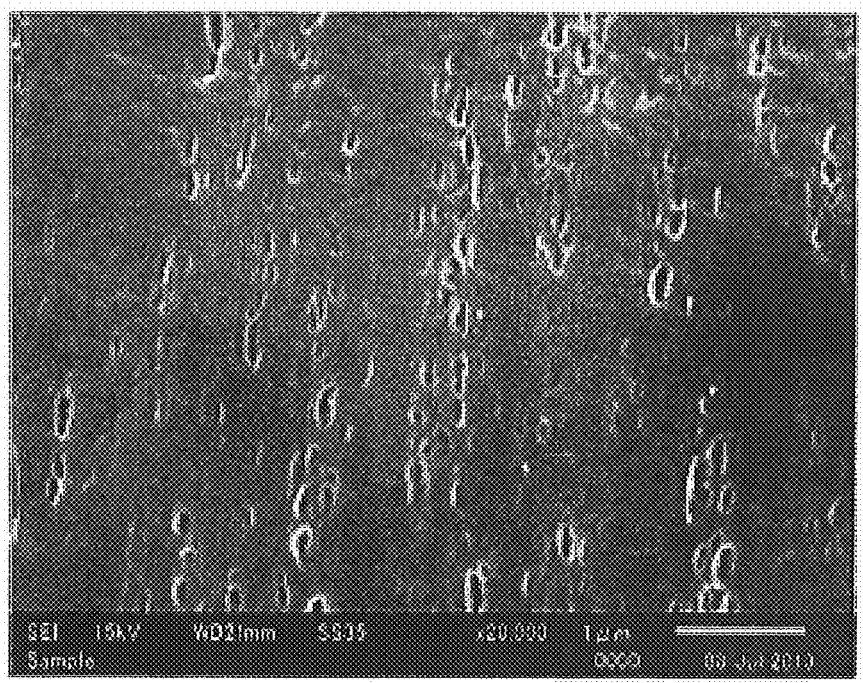
FIG. 11 is a SEM image of the surface of a polytetrafluoroethylene membrane of Example.

Table 1 shows the results of measurements of the average pore diameter, thickness, porosity, water entry pressure, gas permeability, and insertion loss for the PTFE membranes E1 to E3 and PTFE membranes C1 to C3. The values of the insertion loss in Table 1 are those measured using 1,000 Hz sound. FIG. 9 shows the relationship between the sound frequency and the insertion loss for the PTFE membranes. The surface of the PTFE membrane E1 was observed with a scanning electron microscope (SEM). FIGS. 10 and 11 show the SEM images. The SEM image in FIG. 10 is one taken at a magnification of 5,000. The SEM image in FIG. 11 is one taken at a magnification of 20,000.

TABLE 1

|  | Average pore diameter [μm] | Thickness [μm] | Surface density [g/m$^2$] | Porosity [%] | Water entry pressure [kPa] | Gas permeability [sec/100 mL] | Insertion loss (1,000 Hz) [dB] |
| --- | --- | --- | --- | --- | --- | --- | --- |
| PTFE membrane E1 | 0.05 | 8 | 13.8 | 21.0 | 540 | 20400.0 | 1.8 |
| PTFE membrane E2 | 0.05 | 10 | 20.1 | 8.0 | 720 | 55000.0 | 2.9 |
| PTFE membrane E3 | 0.09 | 8 | 13.3 | 24.0 | 500 | 18000.0 | 2.0 |
| PTFE membrane C1 | No pores | 14 | 30.5 | 0.0 | 650 | No permeation | 3.7 |
| PTFE membrane C2 | No pores | 25 | 54.5 | 0.0 | Not measurable | No permeation | 11.4 |
| PTFE membrane C3 | 0.50 | 20 | 3.5 | 92.0 | 400 | 3.0 | 4.1 |

Table 1 reveals that the PTFE membrane E1, the PTFE membrane E2, and the PTFE membrane E3 had a water entry pressure not less than 400 kPa (more specifically not less than 420 kPa, even more specifically not less than 450 kPa, still even more specifically not less than 500 kPa). Table 1 also reveals that the PTFE membrane E1 and the PTFE membrane E3 had an insertion loss not more than 3.5 dB (more specifically not more than 3 dB, even more specifically not more than 2.5 dB, still even more specifically not more than 2.0 dB) for 1,000 Hz sound, and that the PTFE membrane E2 had an insertion loss not more than 3.5 dB (more specifically not more than 3 dB) for 1,000 Hz sound. As shown in FIG. 9, the PTFE membrane E1 had an insertion loss of 2.3 dB for 100 Hz sound, an insertion loss of 1.8 dB for 1,000 Hz sound, an insertion loss of 1.6 dB for 2,000 Hz sound, and an insertion loss of 1.0 dB for 3,000 Hz sound, which means that the insertion loss decreased as the frequency increased between 100 Hz and 5000 Hz. That is, FIG. 9 reveals that the PTFE membrane E1 had an insertion loss not more than 3.5 dB (more specifically not more than 3.0 dB, even more specifically not more than 2.5 dB) for 100 to 5,000 Hz sound. The PTFE membrane E2 had an insertion loss of 3.3 dB for 100 Hz sound, an insertion loss of 2.9 dB for 1,000 Hz sound, an insertion loss of 2.8 dB for 2,000 Hz sound, and an insertion loss of 2.5 dB for 3,000 Hz sound, which means that the insertion loss decreased as the frequency increased between 100 Hz and 5000 Hz. That is, FIG. 9 reveals that the PTFE membrane E2 had an insertion loss not more than 3.5 dB (more specifically not more than 3.0 dB) for 100 to 5,000 Hz sound. The PTFE membrane E3 had an insertion loss of 1.9 dB for 100 Hz sound, an insertion loss of 2.0 dB for 1,000 Hz sound, an insertion loss of 1.8 dB for 2,000 Hz sound, and an insertion loss of 1.1 dB for 3,000 Hz sound, which means that the PTFE membrane E3 had an insertion loss not more than 2.5 dB (more specifically not more than 2.0 dB) for 100 to 5,000 Hz sound. The experimental results shown in Table 1 and FIG. 9 reveal that the PTFE membrane E1, the PTFE membrane E2, and the PTFE membrane E3 had high levels of both waterproofness and sound permeability. FIG. 10 and FIG. 11 confirm that the PTFE membrane E1 had pores formed therein.

INDUSTRIAL APPLICABILITY

The waterproof sound-permeable membrane of the present invention is suitable for application to an electronic device containing an acoustic device. To be specific, the waterproof sound-permeable membrane is suitable for application, for example, to a mobile phone or a digital video camera.

The invention claimed is:

1. A waterproof sound-permeable membrane adapted to permit passage of sound and prevent entry of water,
the waterproof sound-permeable membrane comprising a sound-permeation region comprising a polytetrafluoroethylene membrane, wherein
the polytetrafluoroethylene membrane has an average pore diameter of 0.02 µm or more and 0.1 µm or less as measured according to ASTM F316-86 and has a porosity of 5% or more and 25% or less, and
the polytetrafluoroethylene membrane is a membrane having pores formed therein, the pores being separate from each other by a non-porous base material of the polytetrafluoroethylene membrane.

2. The waterproof sound-permeable membrane according to claim 1, wherein the polytetrafluoroethylene membrane has a thickness of 5 µm or more and 15 µm or less.

3. The waterproof sound-permeable membrane according to claim 1, further comprising an edge region surrounding the sound-permeation region, the waterproof sound-permeable membrane further comprising an adhesive layer secured to the polytetrafluoroethylene membrane in the edge region.

4. The waterproof sound-permeable membrane according to claim 1, further comprising an edge region surrounding the sound-permeation region, the waterproof sound-permeable membrane further comprising a reinforcing member secured to the polytetrafluoroethylene membrane in the edge region.

5. The waterproof sound-permeable membrane according to claim 1, further comprising an edge region surrounding the sound-permeation region, the waterproof sound-permeable membrane further comprising, in the edge region, a reinforcing member secured to one side of the polytetrafluoroethylene membrane and an adhesive layer secured to the other side of the polytetrafluoroethylene membrane remote from the reinforcing member.

6. An electronic device comprising:
a sound emitting part or a sound receiving part;
a housing containing the sound emitting part or the sound receiving part and provided with an opening for directing sound to the sound emitting part or the sound receiving part; and
the waterproof sound-permeable membrane according to claim 1, the waterproof sound-permeable membrane being joined to the housing so as to cover the opening.

* * * * *